(12) United States Patent
Poznanovic (10) Patent No.: US 7,155,602 B2
(45) Date of Patent: Dec. 26, 2006

(54) INTERFACE FOR INTEGRATING RECONFIGURABLE PROCESSORS INTO A GENERAL PURPOSE COMPUTING SYSTEM

(75) Inventor: Daniel Poznanovic, Colorado Springs, CO (US)

(73) Assignee: SRC Computers, Inc., Colorado Springs, CO (US)

( * ) Notice: Subject to any disclaimer, the term of this patent is extended or adjusted under 35 U.S.C. 154(b) by 881 days.

(21) Appl. No.: 10/011,835

(22) Filed: Dec. 5, 2001

(65) Prior Publication Data

US 2003/0046530 A1    Mar. 6, 2003

Related U.S. Application Data

(60) Provisional application No. 60/286,979, filed on Apr. 30, 2001.

(51) Int. Cl.
*G06F 9/45* (2006.01)
(52) U.S. Cl. .................. 713/1; 713/2; 712/10; 712/32; 712/34; 712/36; 716/7; 716/18
(58) Field of Classification Search .................. 713/1, 713/2; 712/10, 32, 34, 36; 716/7, 18
See application file for complete search history.

(56) References Cited

U.S. PATENT DOCUMENTS

| | | | |
|---|---|---|---|
| 4,916,692 A | 4/1990 | Clarke et al. | |
| 5,036,473 A | 7/1991 | Butts et al. | |
| 5,329,630 A | 7/1994 | Baldwin | |
| 5,448,496 A | 9/1995 | Butts et al. | |
| 5,452,231 A | 9/1995 | Butts et al. | |
| 5,612,891 A | 3/1997 | Butts et al. | |
| 5,657,241 A | 8/1997 | Butts et al. | |
| 5,661,662 A | 8/1997 | Butts et al. | |
| 5,664,195 A * | 9/1997 | Chatterji | 717/178 |
| 5,734,581 A | 3/1998 | Butts et al. | |
| 5,796,623 A | 8/1998 | Butts et al. | |
| 5,812,414 A | 9/1998 | Butts et al. | |
| 6,002,861 A | 12/1999 | Butts et al. | |
| 6,052,773 A * | 4/2000 | DeHon et al. | 712/43 |
| 6,434,687 B1 * | 8/2002 | Huppenthal | 712/32 |
| 6,438,737 B1 * | 8/2002 | Morelli et al. | 716/16 |
| 6,542,998 B1 * | 4/2003 | Vorbach et al. | 713/400 |
| 6,564,179 B1 * | 5/2003 | Belhaj | 703/26 |
| 6,753,925 B1 * | 6/2004 | Limaye | 348/515 |
| 6,825,698 B1 * | 11/2004 | Wang et al. | 327/108 |
| 6,859,869 B1 * | 2/2005 | Vorbach | 712/10 |
| 6,964,029 B1 * | 11/2005 | Poznanovic et al. | 716/7 |

* cited by examiner

*Primary Examiner*—A. Elamin
(74) *Attorney, Agent, or Firm*—William J. Kubida; Peter J. Meza; Hogan & Hartson LLP (57) ABSTRACT

The present invention describes a method and system for an interface for integrating reconfigurable processors into a general purpose computing system. In particular, the system resides in a computer system containing standard instruction processors, as well as reconfigurable processors. The interface includes a command processor, a command list memory, various registers, a direct memory access engine, a translation look-aside buffer, a dedicated section of common memory, and a dedicated memory. The interface is controlled via commands from a command list that is created during compilation of a user application, or various direct commands.

10 Claims, 6 Drawing Sheets

INTERFACE FOR INTEGRATING RECONFIGURABLE PROCESSORS INTO A GENERAL PURPOSE COMPUTING SYSTEM

CROSS REFERENCE TO RELATED APPLICATIONS

This application claims the benefit of U.S. Provisional Patent Application No. 60/286,979 filed Apr. 30, 2001, and entitled "Delivering Acceleration: The Potential for Increased HPC Application Performance Using Reconfigurable Logic," which is hereby incorporated by reference in its entirety.

BACKGROUND OF THE INVENTION

1. Field of the Invention

The present invention relates to a method and system for interfacing computer processors. In particular, the present invention relates to a computer system interface that provides for the integration of reconfigurable processors with instruction processors and other reconfigurable processors.

1. Discussion of the Related Art

Typical computing systems generally include traditional instruction processors for processing and controlling the instructions and data flow of a typical computer program. Computer instructions can also be implemented with hardware logic. Hardware logic-implemented functions can greatly accelerate the processing of application algorithms over those same algorithms implemented in software. Sections of code such as compute-intensive algorithms, and/or repetitious instructions can benefit from hardware implementation. Although computer instructions implemented in hardware logic run much faster than those implemented in software, hardware logic is much more expensive to design, develop, and manufacture than an average computer application.

Recently reconfigurable processors have been added to computer systems, allowing for the processing of computer software, as well as providing for the hardware implementation of a computer program or code segments. Any piece of code deemed suitable for hardware performance can be segregated from an application program and processed by one or more reconfigurable processors. The remaining code, the code not converted for hardware implementation, is simply processed by the standard instruction processors.

In such hybrid computer systems the computer code is divided into sections, generally during compilation. Depending on optimization requirements these sections of code can then be processed by one or more instruction processors, and/or one or more reconfigurable processors.

Performance enhancements resulting from reconfigurable computing can provide orders of magnitude improvements in speed for a wide variety of computing code. However, the coordination between the instruction processors, reconfigurable processors, main memory, and various other components can degrade these performance improvements. Additionally, the increased number of components necessary to coordinate such a hybrid computer system can add significantly to the overall cost.

SUMMARY OF THE INVENTION

Accordingly, the present invention is directed to an interface for integrating reconfigurable processors with standard instruction processors and/or other reconfigurable processors into a computer system that substantially obviates one or more of the problems due to limitations and disadvantages of the related art.

The present invention includes an interface control processor, storage for the interface instructions, data registers, flag registers, user registers, and a direct memory access ("DMA") processor.

The reconfigurable processor interface is an active interface. The interface takes direction from instruction processors, reconfigurable processors, as well as the user logic within a reconfigurable processor, yet is capable of control and decision making on its own. This active control is defined through a coordinated effort of the various interface registers, specific areas of common memory, the dedicated reconfigurable processor memory, and the user logic of the reconfigurable processor with an interface control program.

An object of the present invention is to provide a mechanism by which the instruction processors communicate and coordinate with arbitrary user logic in reconfigurable processors.

Another object of the present invention is to provide an active control that allows instruction processors and reconfigurable processors to function autonomously.

Another object of the present invention is to provide a means for moving memory contents between common memory and the dedicated memory of a reconfigurable processor.

A further object of the present invention is to provide a flexible interface that can be defined for arbitrary instruction processor instruction sequences and arbitrary reconfigurable user logic.

Another object of the present invention is to ensure the protected operation of the interface by ensuring that the memory to be referred to is only within the boundaries of a user program.

Another object of the present invention is to provide interaction with a user program without requiring operating system services.

Yet a further object of the present invention is to provide a means for the reconfigurable processor to interact with input/output services.

Another object of the present invention is to divide application programs among instruction processors and reconfigurable processors to achieve optimum performance.

Another object of the present invention is to allow a single-system image to be constructed for a hybrid system of instruction processors and reconfigurable processors.

Another object of the present invention is to allow a single-system image to be constructed for a system of purely reconfigurable processors.

A further object of the present invention is to allow the construction of a cluster of Symmetric Multi-Processor ("SMP") hybrid nodes or strictly instruction nodes, or reconfigurable processor nodes, or various combinations thereof.

Still a further object of the present invention is to allow instruction processors and reconfigurable processors to be integrated into a single-system image SMP architecture system.

A further object of the present invention is to allow reconfigurable processors to be integrated into a single-system image SMP.

Another object of the present invention is to allow the user logic of the reconfigurable processor to coordinate with the rest of a single-system image SMP system.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the interface for integrating reconfigurable processors into a general purpose computing system provides the ability to coordinate the execution of an application that combines processor code and synthesized logic.

In another aspect, the present invention provides an interface for integrating reconfigurable processors into a general purpose computing system. The interface includes: (1) interface control processor for managing the interaction between the at least one reconfigurable processor and the computer system; (2) interface control processor instructions organized into command lists; (3) random access memory for storing the current command list; (4) registers for storing data and settings; (5) common memory; (6) direct memory access logic for coordinating the transfer of the reconfigurable processor instructions and data; (7) address translation buffer for storing translation data and translating virtual memory addresses to physical memory addresses; and (8) dedicated memory.

In a further aspect, the present invention provides a method for processing interface control processor instructions compiled from a user application. This method includes the steps of: (1) storing command lists in a dedicated area of common memory, (2) receiving a fetch command sent by the user application; (3) fetching a command list from the dedicated area; (4) loading the command list into a command list memory within the interface; (5) processing the command list through an interface control processor; (6) interacting with user logic to exchange data and control signals, and (7) determining if another command list is ready for processing, if so, processing the new command list; otherwise, waiting for another fetch command.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiment of the present invention, examples of which are illustrated in the accompanying drawings.

The present invention integrates a computer's instruction processors, common memory, and reconfigurable processors, referred to in the preferred embodiment as Multi-Adaptive Processors ("MAPs"). Through the coordinated effort of the various hardware and software components of the interface with common memory, instruction processor, and MAPs the present invention provides for the interaction of instruction processors and reconfigurable processors providing enhanced performance to a computer system.

Figure 1:
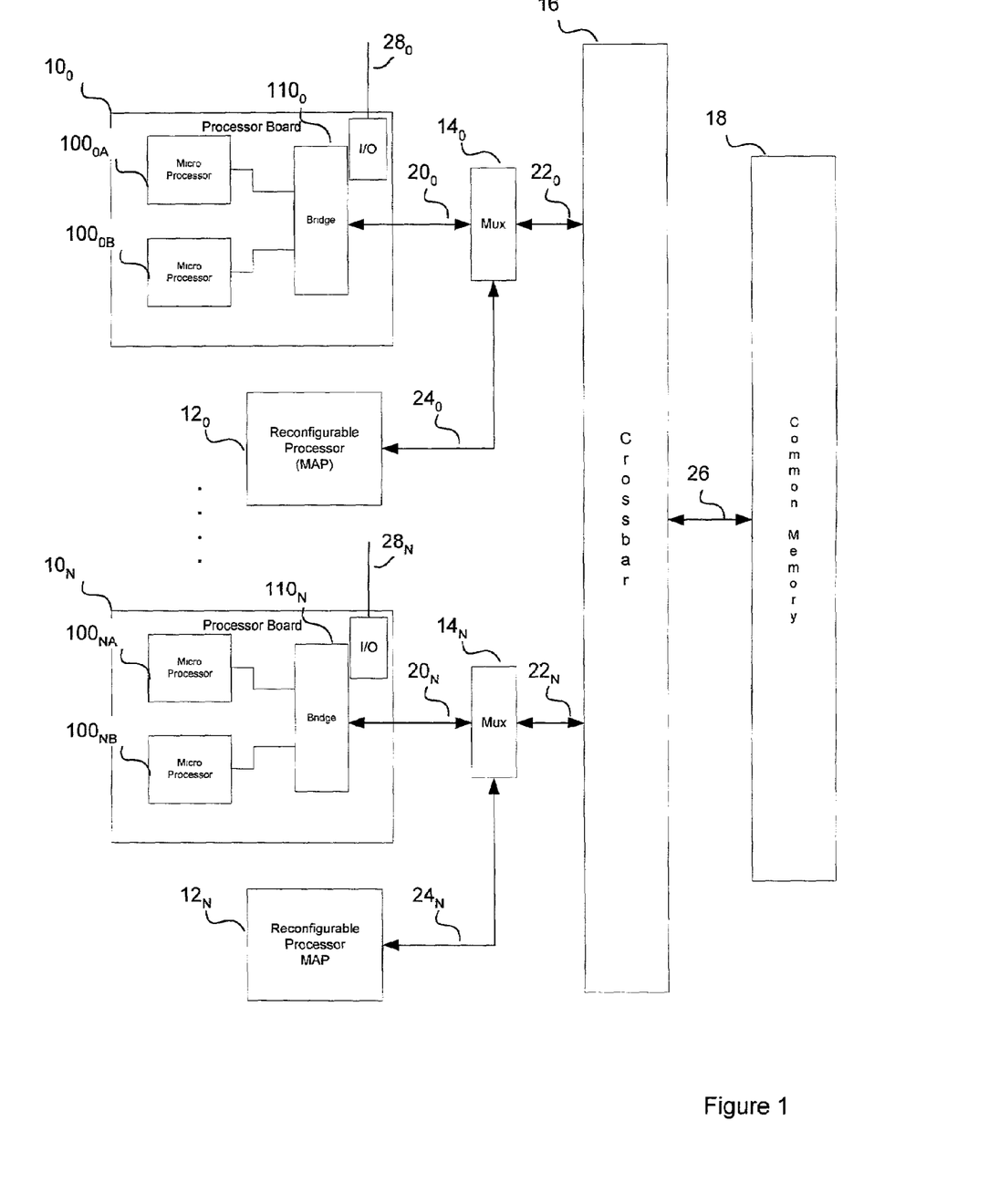
FIG. 1 is a simplified, high level, functional block diagram of a multiprocessor computer architecture, including reconfigurable processors.

Referring to FIG. 1, an overview of the computer system incorporating MAPs 12 is shown. In the preferred embodiment of the present invention the instruction processor boards 10 and MAPs 12 reside on the trunk 20 and 22 to the crossbar 16. The MAPs are connected via a multiplexer 14. The crossbar 16 is then connected to common memory 18 through memory trunk 26. Further embodiments of the present invention allow for placing the instruction processor 10 and/or the MAPs 12 in any other location, including, but not limited to, the memory trunk 26, crossbar switch 16, common memory inter-connect, or I/O bus 28. The instruction processors 100 and MAPs 12 may also be on the same or separate circuit boards, or even integrated on the same computer chip.

Figure 2:
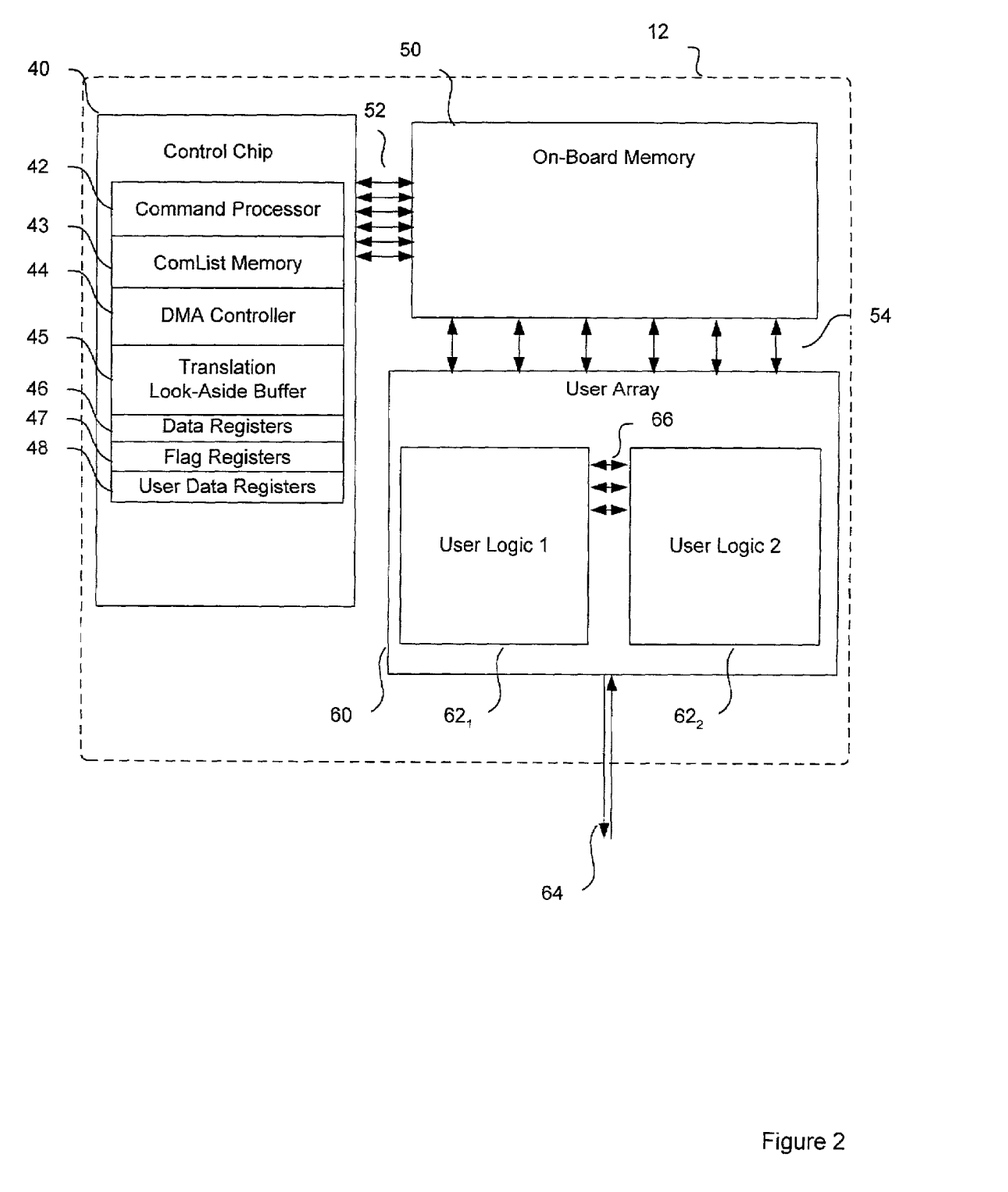
FIG. 2 is a representational diagram of a reconfigurable processor used according to a preferred embodiment of the present invention.

Referring to FIG. 2, the reconfigurable MAP 12 is described in more specific detail. A MAP 12 is a standalone processing unit executing independently of instruction processors during normal operation, as well as while loading and storing data. Each MAP 12 incorporates various hardware components of the preferred embodiment of the present invention, including for purposes of illustration only, an interface control processor, referred to as a command processor 42, command list memory 43, a direct memory access ("DMA") controller 44, a translation look-aside buffer ("TLB") 45, data registers 46, user data registers 48, flag registers 47, and on-board memory 50.

Each MAP 12 also includes user-configured logic known as the user array 60. The user array of the present example contains two large Field Programmable Gate Arrays ("FPGAs"), referred to as user logic ("U_Logic") $62_1$–$62_2$. During compilation the sections of code determined to be suitable for optimization through a hardware implementation, such as discrete algorithmic sections, are segregated out of the program code. The algorithmic sections of code from the application program are converted to provide hardware logic circuits within the user logic $62_1$–$62_2$.

Through the use of an interface control program, including a command list, known as the ComList, the command processor 42 processes commands, makes control decisions, and manages the transfer of data. A ComList is also generated during compilation of the user application. A ComList is used for controlling a MAP 12 or MAPs $12_1$–$12_N$ (FIG. 1) during normal operation. The ComList contains a list of controlling instructions for the MAP's command processor 42 and is initially stored in common memory 18 (FIG. 1) until it is fetched by the MAP's controller 40 into the ComList memory 43.

Common memory addresses specified by commands or generated by user applications are virtual addresses. Addresses are translated, virtual to physical, by TLB 45 entries with the DMA controller 44.

Three sets of registers, data registers 46, user data registers 48, and flag registers 47, are also used to help coordinate the processing of interface instructions. Data registers 46 consist of thirty-two, 64-bit registers known as DR0 through DR31. These registers are generally used to hold addresses for both common memory 18 (FIG. 1) and on-board memory 50; however, they can hold any needed data. By using data registers 46, scalar data can be sent to or received from the user array 60. Simple arithmetic operations, as well as bitwise logic, are supported on these registers. The data register contents can be tested for zero/non-zero; therefore, tests together with branches provide support for loops. For reference purposes, the bits of DR0 are always 0/clear and the lower order bit of DR1 is always 1/set. DR0 contains integer 0 and DR1 contains integer 1. Neither register can be overwritten.

User data registers 48 are thirty-two registers of 64 bits known as UDR0 through UDR31. User data can be sent directly from the ComList to the user array 60 without going through the data registers 46. A group of user data registers 48 can be loaded from the ComList. When the last user data register of the group is loaded the user array 60 is interrupted. The user array 60 must understand the protocol by which user data registers 48 need to be read.

Flag registers 47 are thirty-two single-bit registers FR0 through FR31. Commands can test and wait on the state of flag registers 47 before execution. Commands can change the state of flag registers 47, forcing them set and clear. In addition, there are logical instructions that allow combining flag states (AND, OR, XOR). Other commands allow testing and branching on their contents. For control purposes FR0 is always 0/clear and FR1 is always 1/set. Neither of these registers can be overwritten.

The purpose of the flag registers 47 is to support coordination between different operations. For example, the user logic can coordinate loading and executing a new ComList by setting a specified flag register. A command can test the flag register and then branch to the end of the ComList, indicating that the next ComList may be loaded. As a further example, the user logic can coordinate movement of data in or out of on-board memory 50 using flag registers and data registers. A DMA instruction can be held waiting for a flag register to be set. The user logic can write addresses and length into data registers, and then set a specified flag register, allowing the DMA instruction to execute the movement of data. When the DMA completes, another flag register can be set to indicate to the user logic that data movement is complete.

An additional register visible in the MAP is the ComList pointer 49. This register is saved as part of the MAP status and indicates the index of the next command dispatched in the active ComList. When a MAP is halted the pointer indicates the next command to be executed if execution is restarted.

On-board memory 50 consists of six banks of dual port 512K×64-bit static random access memory ("RAM") providing a total of 24 MB of available memory. Both the DMA controller 44 and the command processor 42 communicate with the on-board memory 50 via the six control-side ports 52. The user array 60 communicates with the on-board memory 50 through the six user-side ports 54.

The user array 60 portion of a MAP 12 is configured as a hardware implementation of the algorithmic requirements of the user application. The user array 60 reads from, and writes to, on-board memory 50 through six user-side ports 54 and can interact with the control logic and the DMA controller 44.

DMA operations within the interface of a MAP 12 run more or less independently of processing within a user's logic. Coordination between these control streams is through the use of the flag registers 47, data registers 46 and user data registers 48.

The DMA controller 44 is initiated by a DMA ComList instruction. The user array 60 writes an address and length into the data registers 46 and sets a flag register 47. The ComList awaits the user array's signal, setting of the flag register, and then executes a DMA instruction that references the data registers 46 that have been setup by the user array. The DMA controller 44 can then signal its completion by setting or clearing a flag register 47 that the user array is monitoring.

The FPGAs, user logic $62_1$ and $62_2$, of the user array 60 are configured during a fetch configuration command from data in common memory and not from an on-board programmable read only memory ("PROM"). User logic $62_1$ and $62_2$ communicate between themselves using three dedicated 64-bit data buses 66 without using any memory bandwidth. MAP modules can also be connected together via a chaining data bus 64. Through the use of chaining ports 64 a particular MAP can send partial results to another MAP, or similarly, can receive such partial results from another MAP. The user array 60 provides all logic for the chaining ports 64. In a preferred embodiment, the chaining ports 64 use Double Data Rate ("DDR") protocol that allows each data line to carry two bits of information. This provides for two chain input ports and two chain output ports. In an alternate embodiment without a DDR protocol only single input and output ports would be available on each MAP. Chaining data flow is basically unidirectional, while the three onboard inter-connecting data buses 66 are bi-directional.

Full system interrupt and semaphore capability is available between MAPs $12_0$–$12_N$ (FIG. 1) and/or instruction processors $100_0$–$100_N$ (FIG. 1). MAPs can send interrupts to processors and can also receive a limited set of commands directly from the processors. Commands received directly from other processors, which are not fetched and executed from a MAP's ComList, are called direct commands. Interrupts are sent by a MAP 12 to a given processor in a twelve bit serial stream along with twelve source synchronous clock pulses.

FR31 provides a specific system interrupt mechanism. When FR31 is set, MAP status is stored in its status and control area and an interrupt is generated. This status operation is conditional on an interrupt enable flag taken from a control word in the status and control area. In all cases, if FR31 sets, MAP execution attempts to halt. For this reason, internally 10 detected errors set FR31.

A Stop switch is provided to add flexibility with handling interrupts sent to a MAP. During normal operation a MAP will run with Stop enabled. This mode allows execution to halt when the MAP is interrupted. However, for diagnostic and debugging purposes, a MAP can run in a Stop disabled mode, providing the MAP with the ability to continue execution of a program, even when it has been interrupted.

Stopping/halting MAP execution can result from several sources. In all cases this requires setting or attempting to set FR31. When there is an attempt to set FR31 either directly, or indirectly, and Stop is enabled, execution of the MAP is halted.

Figure 3:
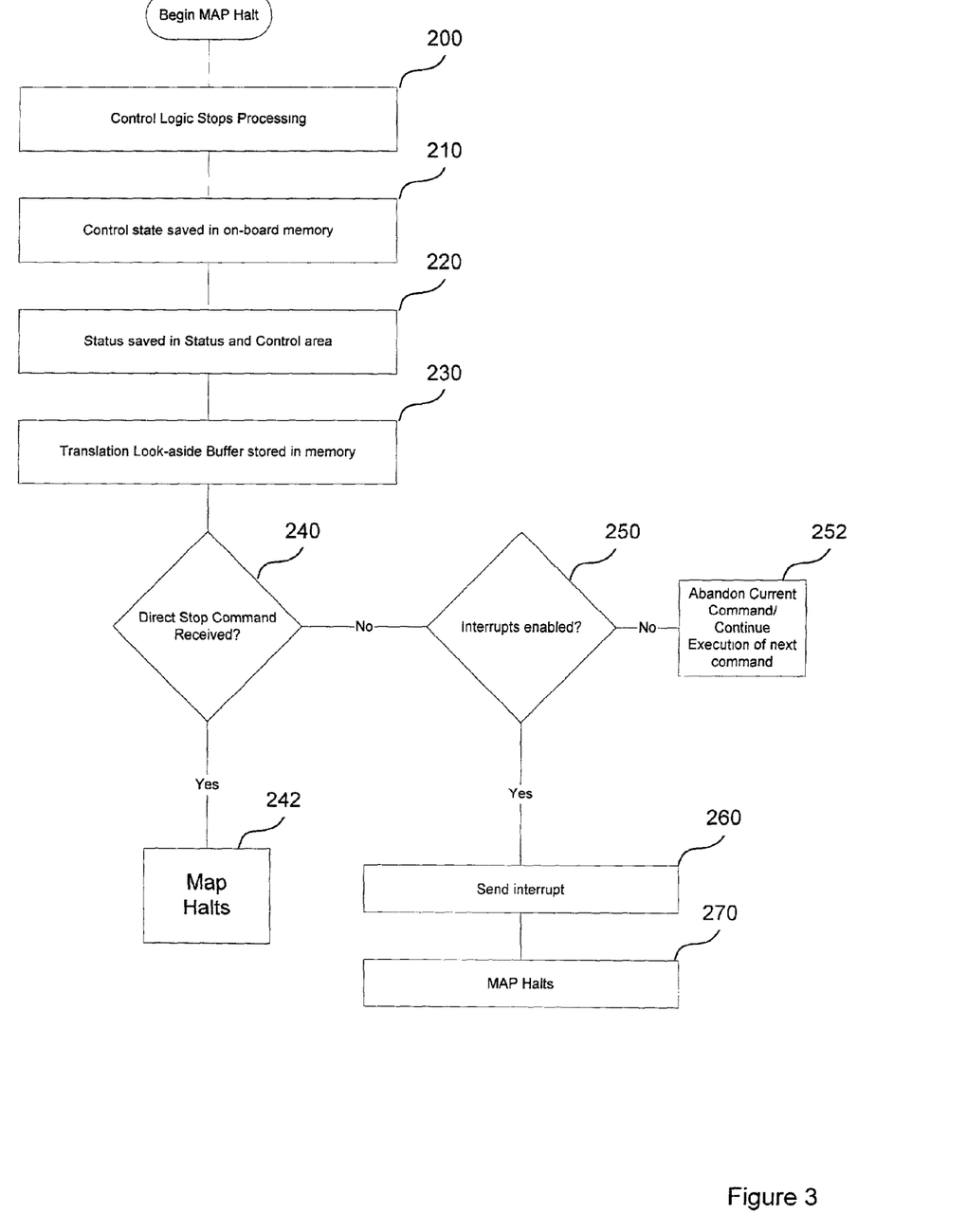
FIG. 3 is a flow diagram of the method of halting the instruction processing of a reconfigurable processor.

Referring to FIG. 3, the MAP can be interrupted in the following situations: (1) a direct Stop command is received from a processor, (2) FR31 is set from the ComList, (2) FR31 is set from the user logic, or (4) the command processor detects an error, such as an address exception, page or memory fault, or some other internal fault. Upon any halt or exception, with Stop enabled, the following occurs: MAP control logic comes to the most graceful halt it can, waiting for execution logic to go quiet step 200. The control state is saved in on-board memory addresses 0–31 step 210. Status is stored into the MAP's status and control area of common memory step 220. The MAP's TLB registers are stored into the TLB area step 230. If a direct stop command was received step 240 the MAP is stopped step 242, otherwise if interrupts are enabled step 250, an interrupt is sent step 260 and the MAP unit halts step 270. If Stop is disabled step 250, the sequence above is executed except that in the last step the command that caused the error is abandoned and execution continues step 252.

Figure 4:
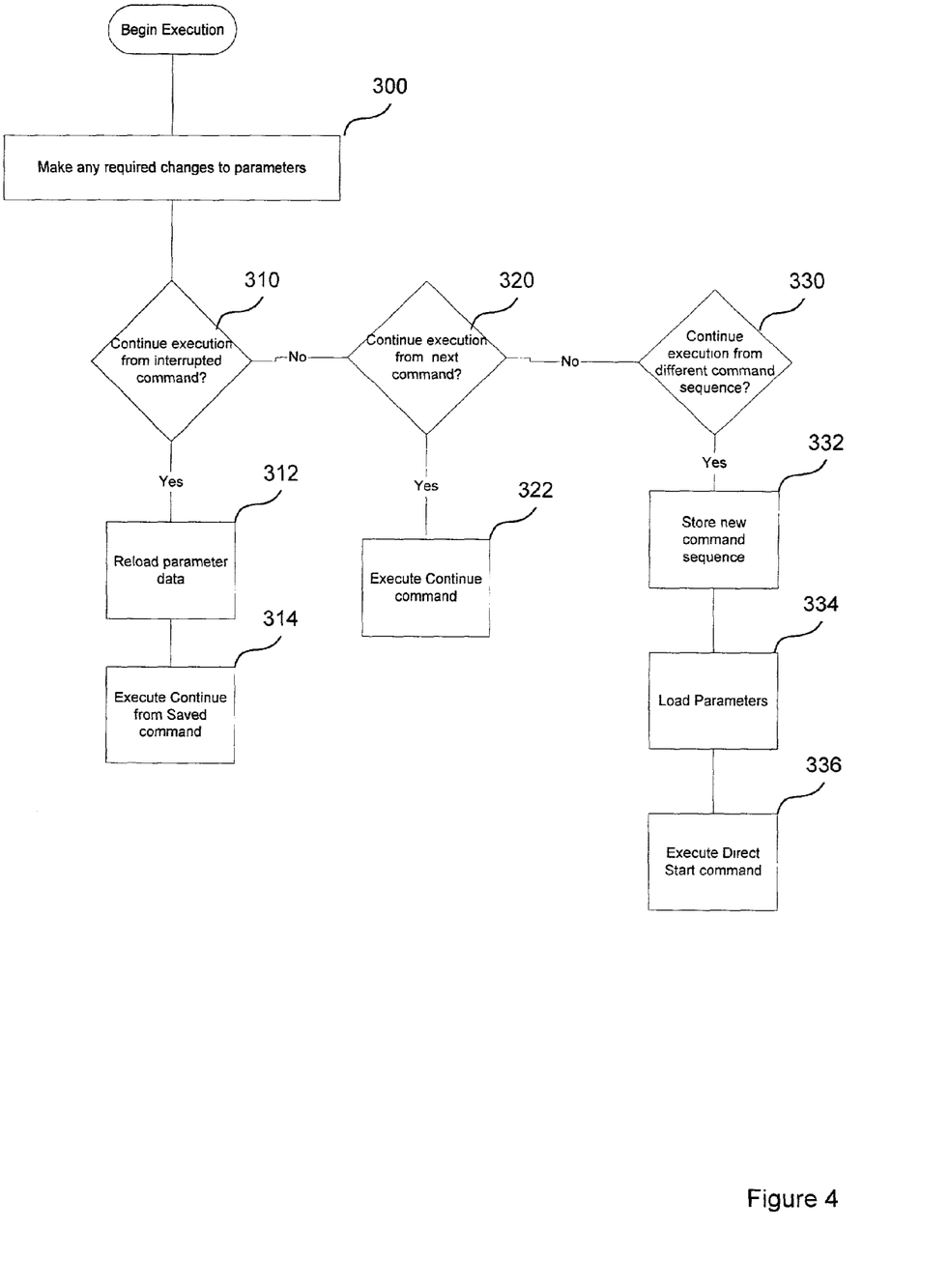
FIG. 4 is a flow diagram of the method of restarting the execution of a reconfigurable processor after it has been halted.

Referring to FIG. 4, to continue after execution halts the following steps are made: any necessary changes to the MAP's parameters in the status and control area are made, including the TLB entries step 300. Determine if processing is to continue from the interrupted command step 310, the next command step 320, or from another command sequence step 330. If continuing execution of the instruction that caused the halt, reload all saved parameters step 312 and then Continue from Saved step 314. If the halt was not caused by an error or TLB miss (so that no instruction is partially executed) and the status and control parameters do not require changing or updating, then the direct command Continue can be sent to the MAP step 322. If a new sequence is to be started (for example, a new user or the current user with different commands), the proper command sequence must be stored in ComList step 332, then direct commands are made to load parameters step 334 and Start execution step 336.

Figure 5:
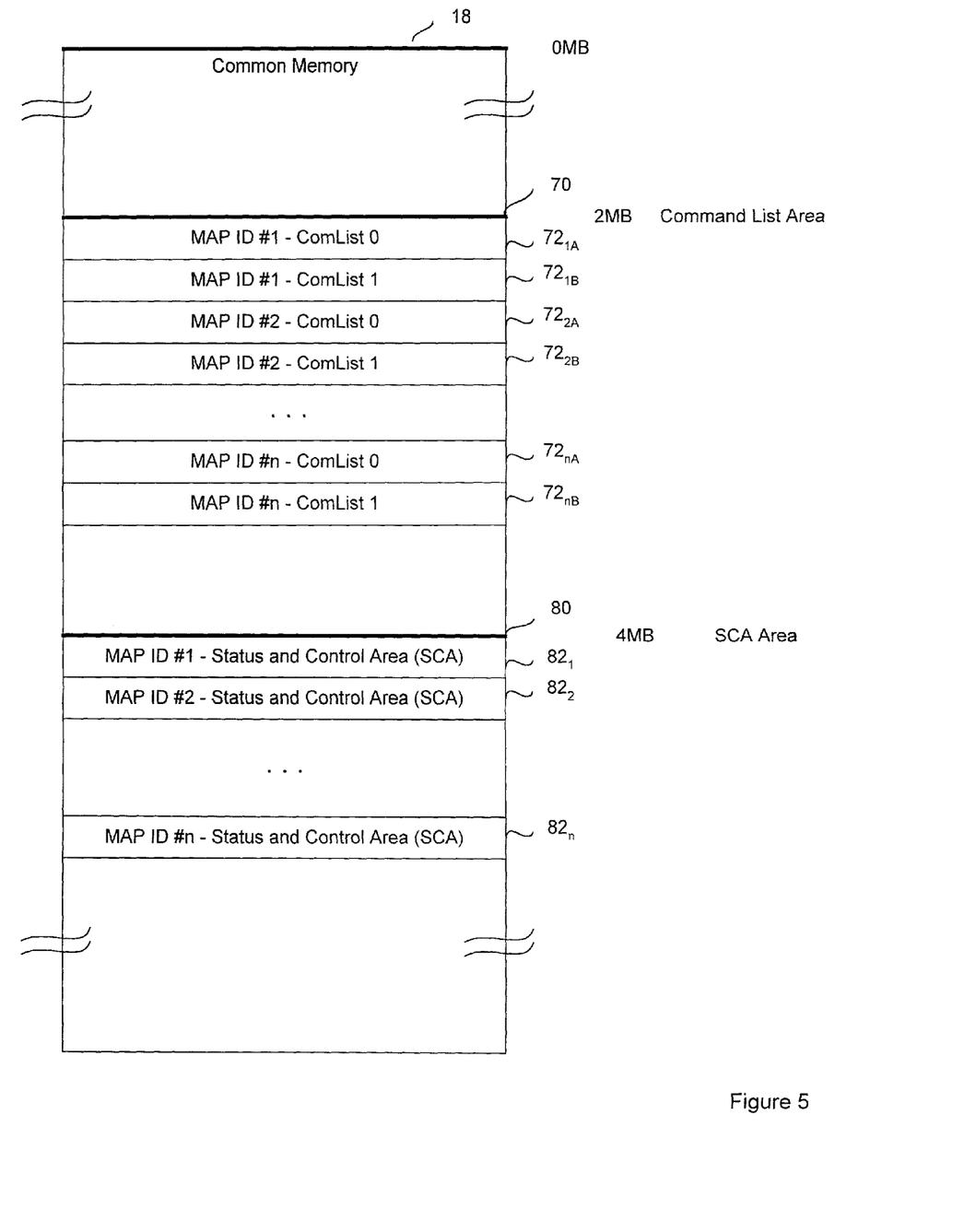
FIG. 5 is a representational diagram of a common memory organization according to a preferred embodiment of the present invention.

Referring to FIG. 5, MAPs are actively controlled through the interface control program. The components of the interface control program include a pair of ComList pages $72_{1A}14\ 72_{1B}$ located in the ComList area 70 of common memory 18, a status and control page $82_1$, located in the status and control area 80 in common memory 18, which holds status and control information and TLB data. Additional components, which coordinate to provide interface control, include the data registers 46, user data registers 48, flag registers 47, on-board memory 50, TLB 45 and user array 60.

The MAPs interface is controlled by commands in the ComList or direct commands issued by an instruction processor or another MAP. During compilation an application generates code for the standard instruction processor, ComLists for the MAP's interface, and hardware logic for the MAP's user array. ComLists are generated by the user application in order to coordinate data movement and control between the application code running in the instruction processor, and application logic running in the MAP's user array. Commands in the ComList correspond directly to instructions in a reduced instruction set computer ("RISC") processor. These instructions are a small set of simple instructions for moving data, testing conditions, and branching. FPGA control processors can be reconfigured to function with various instruction sets, depending upon implementation needs.

Each MAP 12 (FIG. 2) is provided with two 4-KB ComList pages $72_A$ and $72_B$ from the ComList area 70 in common memory 18 providing a maximum useable space for each ComList of 512 words. Each ComList page is identified through a unique MAP ID number. For each MAP 12 (FIG. 2), the address of the ComList pages $72_{1A}$, $72_{1B}$ through $72_{NA}$, $72_{NB}$ are specified in conjunction with the ID number of the associated MAP 12. Starting at relative address 0K in each MAP's ComList page $72_{A+B}$ is the first command list, ComList0 $72_A$, for that MAP. The second command list, ComList1 $72_B$, is located at address 4K of that MAP's ComList area $72_{A+B}$. Two ComList pages $72_A$ and $72_B$ are used to allow each MAP to work from one ComList page while the application software is loading the other ComList page. By swapping ComList pages the latencies of the processor and DMA are significantly reduced.

The first word in each ComList is the ComList Length Command that defines the total number of command words in the buffer. For example, if there were only one additional command in the ComList, the first word, the Length Command, would have the value 2. This indicates that the ComList contains the length command word plus one additional command word.

Figure 6:
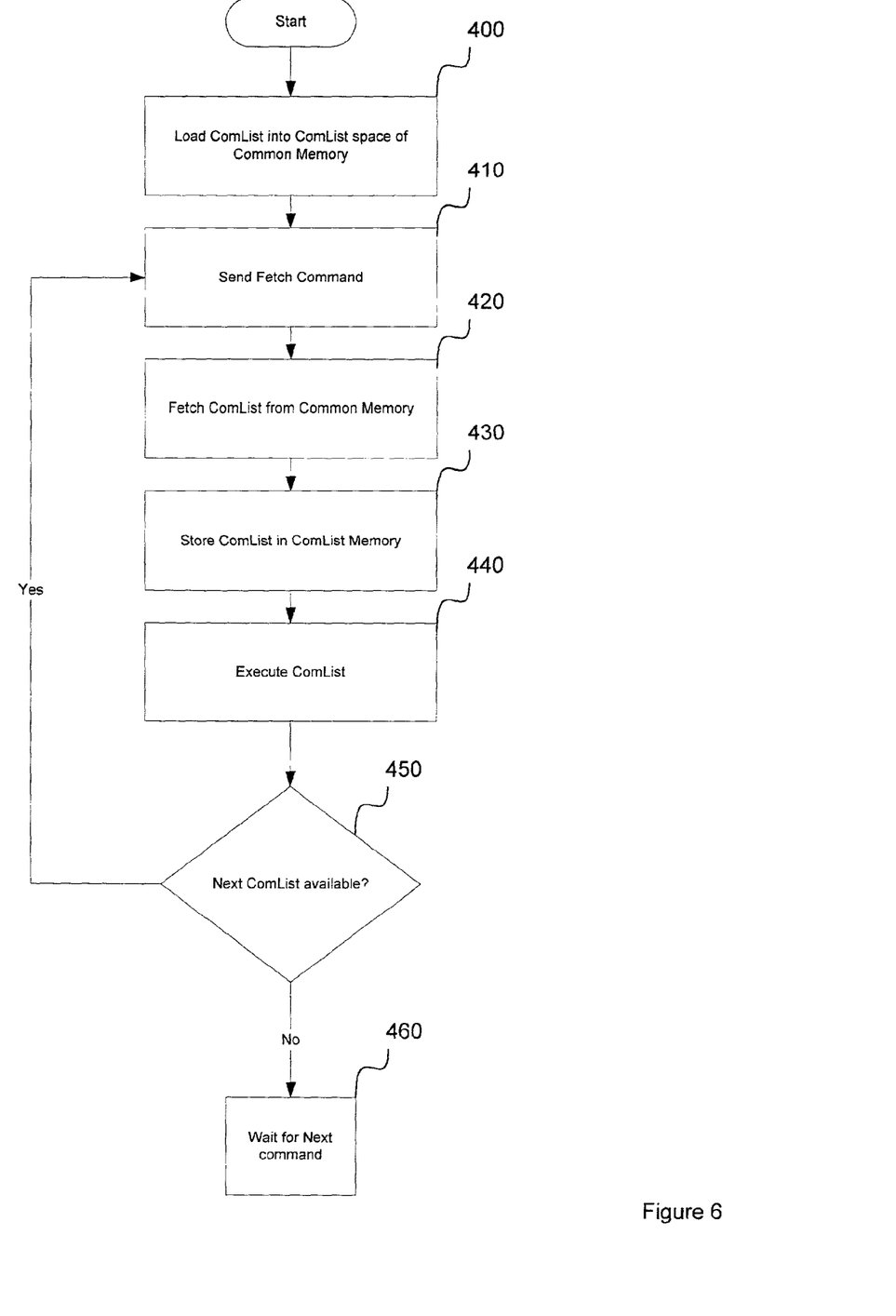
FIG. 6 is a flow diagram of the method of processing interface control processor instructions.

Referring to FIG. 6, the application software loads a ComList into an available ComList page, ComList0 or ComList1, of common memory step 400, when ComList0 or ComList1 is ready to be processed the instruction processor sends a corresponding direct instruction, Fetch0 or Fetch1, to the command processor step 410. The ComList is fetched from common memory step 420. The DMA only transfers enough cache lines to read all of the active ComList0. The complete ComList is stored in the ComList memory area 43 (FIG. 2), RAM set aside specifically for the ComList, of the control logic step 430. Placing the ComList in RAM allows the command processor 42 (FIG. 2) to execute ComList loop instructions. However, the ComList commands can only loop within one ComList and not from one ComList to another. Once loading of the ComList into the ComList memory area 43 (FIG. 2) is complete a FETCHDONE signal is provided to the MAP command processor 42 (FIG. 2) and the ComList is executed step 440.

Each ComList is a maximum of 496 words in length, reserving the upper portion of the ComList memory area 43 (FIG. 2) for bringing in 8 status and control words. A Fetch0 or Fetch1 direct command can be issued prior to completion of the current ComList, queuing up the next ComList. When the processing of a ComList is complete, the command processor 42 (FIG. 2) checks for the availability of another ComList step 450. If another ComList is ready it is processed in the same manner as the preceding ComList, otherwise the MAP 12 (FIG. 2) awaits further instructions step 460.

If the command processor 42 (FIG. 2) begins executing a ComList that has a length of over 496, an error interrupt and halt will be generated. As in any other processor, commands are executed sequentially unless the sequence is changed with a branch or is halted. Commands are available to set addresses, do DMA functions, branch and loop within a ComList, control and send parameters to the user array, etc.

ComList commands are either 8 bytes or 16 bytes long. All commands, except certain direct commands, are fetched by the DMA controller 44 (FIG. 2) from the ComList pages $72_{A+B}$ (FIG. 5) in common memory 18 (FIG. 5) and executed by the command processor 42 (FIG. 2).

If the command processor 42 (FIG. 2) executes the last command in the ComList space, and it is not a taken branch, execution stops. A direct command of Fetch0 or Fetch1 is required to restart execution. If a Halt command is executed in a ComList sequence either a Start or Continue direct command is required. An interrupt is conditionally generated if MAP execution halts.

According to the preferred embodiment of the present invention the data fields in the first 8 bytes of a ComList command are structured in the following manner:

| bit   | 63   |      |   |   |   |   |   |   |    |    |    |    |    |    |    | 00 |
|-------|------|------|---|---|---|---|---|---|----|----|----|----|----|----|----|----|
| field | size | code | a | b | c | d | e | f | aa | bb | cc | dd | ee | ff | gg | hh |
| width | 2    | 4    | 1 | 1 | 1 | 1 | 1 | 1 | 5  | 5  | 5  | 5  | 5  | 5  | 12 | 10 |

The ComList Length Command is the first command in each ComList and is always located at address 0 of the ComList. The Length Command provides the total number of command and immediate data words contained in that particular ComList. The value in field (hh) may range from 2 to 496 words. A value of 2 would indicate that only the ComList Length Command is present plus one command word. A value of 496 is the max number of command words that can be used in the buffer. This max limit allows scratchpad room at the top of the 512-word buffer for status and control information.

When the command processor 42 (FIG. 2), reads the first word in the buffer, an error will be generated if it is not a ComList Length Command with a value of from 2 to 496 in the hh field, and all zeros in the unused fields. Likewise, an error will be generated if an invalid command size, or command code, is found in an instruction. When the last word in the ComList is executed, the Command Processor will switch execution to the next ComList, if one is available.

Valid data for the fields of a ComList Length Command is as follows:

| size                       | 00, One word command           |
|----------------------------|--------------------------------|
| code                       | 000, ComList Length Command Code |
| a, b, c, d, e, f           | 0, unused                      |
| aa, bb, cc, dd, ee, ff, gg | 0, unused                      |
| hh                         | ComList length (2 to 496)      |

Direct Memory Access Commands move data between common memory 18 (FIG. 1) and a MAP's on-board memory 50 (FIG. 2). Data is always moved to and from common memory 18 (FIG. 1) in a stride-1 fashion: linearly with all bytes referenced.

Stride or gather/scatter address sequences can be specified as on-board memory addresses. The stride or gather/scatter address offsets are sized indexes. This means that stride or gather/scatter indexes are multiplied by the operand stream data size (8 bytes) before being added to a specified base address. Stride and gather/scatter indexes can be negative. Overflow will not be detected. For gather/scatter operations, the index list is taken from on-board memory 50 (FIG. 2).

Valid data for the fields of a Direct Memory Access Command is as follows:

| size | 00, One word command |
|------|----------------------|
| code | 0000, DMA Command Code |
| a    | 0, Load (move data to on-board memory from common memory) |
|      | 1, Store (move data to common memory from on-board memory) |
| b    | 0, Stride |
|      | 1, Gather from on-board memory (if a = 1), Scatter to on-board memory (if a = 0) |
| c    | 0, clear Flag when data movement complete |
|      | 1, set Flag when data movement complete |
| d, e, f | unused |
| aa   | Common memory address data register ("DR") |
| bb   | Movement complete flag register ("FR") |
| cc   | On-board memory address DR |
| dd   | Data length DR (number of operands to be moved) |
| ee   | Stride DR (if b = 0), |
|      | Gather/Scatter address in on-board memory DR (if b = 1) |
| ff, gg, hh | unused |

Data in on-board memory can have the address reference sequence specified with a stride or with a sequence of gather/scatter addresses. The register DRee defines the stride and the format of the stride definition is as follows:

| BIT FIELD WIDTH | 63:60 UNUSED 4 | 59:52 STRIDE 8 | 51:04 BANK SEQUENCE 16 3 BIT FIELDS | 03:00 MODULUS 4 |
|---|---|---|---|---|

The modulus field controls the number of banks in the bank sequence. A zero modulus indicates one bank in the bank sequence. A value 15 indicates a 16 bank sequence. The bank sequence has 16 fields of bank numbers. The bank numbers range from 0 to 7, where bank 7 is a no operation ("NOP") bank, meaning data will be discarded on a "write" and zero filled on a "read". The stride field provides an increment for addresses in on-board memory. The address is incremented by the stride value after all banks in the sequence are addressed.

For gather/scatter operations, the gather/scatter indexes are 32-bit/4-byte quantities taken from on-board memory. Each index is added, sign-extended, to the address base in DRcc, after having been multiplied/shifted by the operand size.

The address in register DRaa is a byte address. The address in register DRcc is a word address that specifies addresses in individual banks of on-board memory. The striding and striping of the bank references is controlled by the content of the DRee register when b-field=0.

For DRaa, at least the bottom 50 bits of the address specifier must be valid. For DRcc, the number of address bits that must be valid is implementation dependent.

All common memory addresses are virtual and are translated using translation look-aside buffers loaded from a MAP's status and control page. On-board memory addresses are physical and are not modified or translated.

The direct memory access command, according to parameters c and bb, sets or clears a flag register when the last specified data has been moved. For writes, this is done when the last data has been read from on-board memory and is on its way to common memory 50 (FIG. 2). For reads, this is done when the last data has been written to on-board memory 50 (FIG. 2).

This command does not support waiting on a flag register value. If this is necessary, a DMA Flag Set command with the parameter fields set to wait for the needed value is available.

If ee=0 or (ee)=0, all data from common memory 18 (FIG. 1) is placed in the same on-board memory 50 (FIG. 2) address for a load operation. As data is returned in no fixed order, the final contents of the specified address are undefined. On a store with a stride of 0, all addresses referred to in common memory 18 (FIG. 1) end up with the specified operand from on-board memory 50 (FIG. 2).

It is intended that DMA functions be issued as quickly as is reasonably possible for an implementation and with maximum parallelism. One operation does not have to complete before another is started unless wait commands are placed between operations, allowing multiple DMA operations to be processing simultaneously.

The DMA Flag Set Command sets Flag register bits. It can do this when the DMA Flag Set command becomes available for issue or the command can wait for some DMA activity to be completed. This allows synchronization of the data movement of the DMA with the execution of a flag command. This command can also be followed with U_Data commands if it is desired to transfer command or data parameters to the user array after a DMA operation is complete.

The DMA Flag Set Command is a two word command. The first word contains the command data and the second word contains immediate values for the flag register (i.e. bit2 is applied to FR2, bit3 to FR3 . . . , bit31 to FR31).

Valid data for a DMA Flag Set Command is as follows:

| | |
|---|---|
| size | 01, Two-word command |
| code | 0100, DMA Flag Set Command Code |
| a | 0, don't wait for DMA read |
| | 1, wait for DMA read quiet |
| b | 0, don't wait for DMA write |
| | 1, wait for DMA write quiet |
| c | 0, unused |
| d | 0, wait until flag clear |
| | 1, wait until flag set |
| e, f | unused |
| aa | Operation (numbers are base 16) |
| | 11, Or |
| bb | Wait Flag FR |
| cc, dd, ee, ff, gg, hh | unused |
| mm | 64 bit immediate value (bit2 is applied to FR2, bit3 to FR3 . . . , bit 31 to FR31 |

If a=1 then issuance of this command is held until all DMA read activities have ceased. Similarly, if b=1 then issuance of the command is held until DMA writes have been sent to common memory. If multiple bits, including the Wait flag bb are active, all conditions must be true to issue the command.

Any flag register that corresponds to a 1 bit in the mm field is set to a 1. Any flag register that corresponds to a 0 bit is not changed. The command lets the completion of a DMA action set any of the selected flag registers.

Register-to-Register Data Register Arithmetic/Logic Commands do register-to-register integer add and subtract operations, and OR, AND, and XOR bitwise logical operations.

Valid data for the Register-to-Register Data Register Arithmetic/Logic Commands is as follows:

| | |
|---|---|
| size | 00, One word command |
| code | 0001, DR arithmetic |
| a, b, c, | unused |
| d | 0, wait until flag clear |
| | 1, wait until flag set |
| e, f | unused |
| aa | Operation (numbers are base 16) |
| | 00, Add |
| | 01, Sub |
| | 03, OR |
| | 04, AND |
| | 05, XOR |
| bb | Wait Flag FR |
| cc | Source1 DR |
| dd | Source2 DR |
| ee | Result DR |
| ff, gg, hh | unused |

For subtractions, DRcc is the minuend and DRdd is the subtrahend. Arithmetic operations are as follows: DRee←DRcc±DRdd. Bitwise logical operations are as follows: DRee←DRcc OR/AND/XOR DRdd. Overflow is not detected.

Immediate Data Register Arithmetic/Logic Commands add, subtract, OR, AND, or XOR 64-bit immediate values to Data Registers. The Immediate Data Register Arithmetic/Logic Command is a two-word command. The first word contains the command data and the second word contains the 64-bit immediate value.

Valid data for an Immediate Data Register Arithmetic/Logic Command is as follows:

| | |
|---|---|
| size | 01, Two word command |
| code | 0001, DR arithmetic |
| a, b, c, | unused |
| d | 0, wait until flag clear |
| | 1, wait until flag set |
| e, f | unused |
| aa | Operation (numbers are base 16) |
| | 00, Add |
| | 01, Sub |
| | 03, OR |
| | 04, AND |
| | 05, XOR |
| bb | Wait Flag FR |
| cc | Source 1 DR |
| dd | 0, unused |
| ee | Result DR |
| ff, gg, hh | unused |
| mm | 64 bit immediate value |

The addition and subtraction operations are as follows: DRee←DRcc±(mm). The logical operations are as follows: Dree←DRcc OR/AND/XOR (mm). Overflow is not detected.

Single Data Register Load/Store Commands allow for a single Data register to be loaded from or stored to on-board memory. All 8 bytes are moved.

Valid data for Single Data Register Load/Store Commands is as follows:

| | |
|---|---|
| size | 00, One word command |
| code | 0010, DR Load/Store |
| a | 0, Load (move data to DRs from On-board memory) |
| | 1, Store (move data to On-board memory from DRs) |
| b, c | unused |
| d | 0, wait until flag clear |
| | 1, wait until flag set |
| aa | unused |
| bb | Wait Flag FR |

| | |
|---|---|
| cc | Address base DR |
| dd | Address index DR |
| ee | DR to Load (a = 0) or Store (a = 1) |
| ff, gg, hh | unused |

The contents of DRee are loaded or stored according to the a parameter. The on-board memory address referred to is DRcc+DRdd. Overflow is not detected.

Multiple Data Register Load/Store Commands are two-word commands using 32-bit immediate values. The first word contains the command data and the second word contains immediate values for the data registers (i.e. bit2 is applied to DR2, bit3 to DR3 . . . , bit31 to DR31). Any of the data registers can be moved to/from on-board memory. Each 1 bit in the immediate value enables the corresponding data register to be loaded or stored. Each Data register that has a corresponding 0 bit is ignored. The data in on-board memory is packed/compressed. (For example, if the immediate value has only two 1 bits corresponding to DR3 and DR10 and the on-board memory address is 1000 in a store operation, then DR3 is stored in on-board memory in word 1000 and DR10 is stored in 1001.)

Valid Data for Multiple Data Register Load/Store Commands is as follows:

| | |
|---|---|
| size | 01, Two word command |
| code | 0010, DR Load/Store |
| a | 0, Load (move data to DRs from On-board memory) |
| | 1, Store (move data to On-board memory from DRs) |
| b, c | unused |
| e, f | unused |
| d | 0, wait until flag clear |
| | 1, wait until flag set |
| aa | unused |
| bb | Wait Flag FR |
| cc | On-board memory address DR |
| dd, ee, ff, gg, hh | unused |
| mm | 64 bit immediate value |

Data Register Branch Command tests a data register for a zero/nonzero state. If the test is successful, a branch to the specified command in the ComList is taken; otherwise the next command in the ComList is executed.

Valid data for a Data Register Branch Command is as follows:

| | |
|---|---|
| size | 00, One word command |
| code | 0011, DR Branch |
| a | unused |
| b | 0, test (cc) for zero |
| | 1, test (cc) for nonzero |
| c | 0, unused |
| d | 0, wait until flag clear |
| | 1, wait until flag set |
| aa | unused |
| bb | Wait flag FR |
| cc | Tested DR |
| dd, ee, ff, gg | unused |
| hh | Branch index immediate |

The value in the hh field is an 8-byte word index from the start of a MAP's ComList. For example, if hh=0, this would specify a branch to the first word of the ComList, the ComList length, which would be an invalid command to execute. Valid command addresses would be 1 through 495 providing that it is a command word and not an immediate data address. All bits in hh must be valid otherwise execution is undefined.

A further embodiment of this command, and the similar Flag Register Branch, would allow for subroutine calls and returns.

Register-to-Register Flag Register Logic Commands perform logic operations on the Flag registers.

Valid data for a Register-to-Register Flag Register Logic Command is as follows:

| | |
|---|---|
| size | 00, One word command |
| code | 0100, FR Logic |
| a, b, c, | unused |
| d | 0, wait until flag clear |
| | 1, wait until flag set |
| e, f | unused |
| aa | Operation (numbers are base 16) |
| | 10, AND |
| | 11, OR |
| | 12, XOR |
| bb | Wait Flag FR |
| cc | Source 1 FR |
| dd | Source 2 FR |
| ee | Result FR |
| ff, gg, hh | unused |

Three of the Flag Registers have special values or functions. FR0 is always 0/clear, and FR1 is always a 1/set. If FR31 sets, and interrupts are enabled, an interrupt and halt is generated after control logic idles down command execution and stores status to the MAP's status and control area. If FR31 is set when a command attempts to set it again, no further or secondary interrupt is generated from the attempt to set the Flag, but the interrupt Cause Bits are saved in MAP status. Setting FR31 will always halt MAP execution.

Immediate Flag Register Logic commands perform logic operations on all 32 Flag registers at the same time. Each bit of the immediate value in the command is logically combined with the respective Flag Register with results written back to each register bit. Bits 0 and 1 of the immediate value (bits 32 and 33 of the command) are ignored as FR1 and FR1 are constant values. This command is similar to a DMA Flag Set command with the exception that the DMA wait bits are set to 0.

Valid data for the Immediate Flag Register Logic command is as follows:

| | |
|---|---|
| size | 01, Two word command |
| code | 0100, FR Logic |
| a | 0, unused |
| b | 0, unused |
| c | 0, unused |
| d | 0, wait until flag clear |
| | 1, wait until flag set |
| e, f | unused |
| aa | Operation (numbers are base 16) |
| | 10, AND |
| | 11, OR |
| | 12, XOR |
| bb | Wait Flag FR |
| cc, dd, ee, ff, gg, hh | unused |
| mm | 64 bit immediate value (bit2 is applied to FR2, bit3 to FR3 . . . , bit31 to FR31) |

The commands let any group of Flag registers, from the complete set down to no registers (a NOP), be cleared, set, or toggled.

Flag Register Branch A FR is tested for zero/nonzero. If the test is successful branch to the specified command in ComList, otherwise execute the next command in the list.

Valid data for the Flag Register Branch Command is as follows:

| | |
|---|---|
| size | 00, One word command |
| code | 0101, FR Branch |
| a | unused |
| b | 0, test (cc) for zero |
| | 1, test (cc) for nonzero |
| c | 0, unused |
| d | 0, wait until flag clear |
| | 1, wait until flag set |
| aa | unused |
| bb | Wait flag FR |
| cc | Tested FR |
| dd, ee, ff, gg | unused |
| hh | Branch index immediate |

The value in the hh field is an 8-byte word index from the start of a MAP's ComList. For example, if hh=0 this would specify a branch to the first word of the ComList, the ComList length, which would be an invalid command to execute. Valid command addresses would be 1 through 495 providing that it is a command word and not an immediate data address. All bits in hh must be valid; otherwise execution is undefined.

DR Data U_Data Command sends command and parameter information from a specified data register to the user array. It is up to the logic that receives the data to interpret it as needed. This command transfers data from the DR defined in field dd to the User_Register defined in field cc. There are up to 32 user registers that are contained in a section of RAM above where the Data Registers are located. The User Registers differ from the Data Registers in being unidirectional from the control logic to the user array. When the ComList has filled the desired number of User Registers, it should set the Last Transfer bit in field f indicating that this is the last User Register of the group to be transferred. A user register available signal is raised and is available to the user logic when field f is set to indicate tht the last user register is transferred. It is up to the user array to know which registers need to be fetched. For example, it may be that only User Register00 is used. Or, possibly, only the first four user registers are used. Another possible protocol is that the User Register00 contains a bit set for each of the user registers to be fetched. The particular U_Logic algorithm implemented defines the User Register protocol.

Valid data for a Data Register $U_{13}$ Data Command is as follows

| | |
|---|---|
| size | 00, One-word command |
| code | 0110 U_Logic Command Code |
| a, b, c | 0, unused |
| d | 0, wait until FR wait flag clear |
| | 1, wait until FR wait flag set |
| e | 0, unused |
| f | 0, more U_Data coming |
| | 1, last U_Data transfer |
| aa | unused |
| bb | Wait Flag FR |
| cc | U_Data register address (0 through 31) |
| dd | DR Register for U_Data source |
| ee, ff, gg, hb | unused |

Immediate Data U_Data Command is a 16-byte command that sends command and parameter information from an immediate value in the command to the user array. It is up to the logic that receives the data to interpret it as needed. This command transfers immediate data to the User_Register defined in field cc. There are up to 32 User Registers that are contained in a section of RAM above where the Data Registers are located. The User Registers differ from the Data Registers in being unidirectional from the control logic to the user array. When the ComList has filled the desired number of User Registers, it should set the Last Transfer bit in field f to indicate this is the last User Register of the group transferred. A user register available signal is raised and is available to the user logic when field f is set to indicate tht the last user register is transferred. It is up to the user array to know which registers need to be fetched. For example, it may be that only User Register00 is used. Or, possibly, only the first four User Registers are used. Another possible protocol is that the User Register00 contains a bit set for each of the user registers to be fetched. The particular U_Logic algorithm that is implemented defines the protocol used.

Valid data for an Immediate Data U_Data Command is as follows:

| | |
|---|---|
| size | 01, Two-word command |
| code | 0110, U_Logic Command Code |
| a, b, c | 0, unused |
| d | 0, wait until FR wait flag clear |
| | 1, wait until FR wait flag set |
| e | 0, unused |
| f | 0, more U_Data coming |
| | 1, last U_Data transfer |
| aa | unused |
| bb | Wait Flag FR |
| cc | U_Data register address (0 through 31) |
| dd, ee, ff, gg, hh | unused |
| mm | 64 bit immediate value |

U_Data commands/parameters can be sent after the execution of the command DMA Flag Set. Up to thirty-two 64-bit immediate values can be sent from either Data Registers or the second immediate data words. It is up to the receiving user array to read and interpret the information sent. In turn, the user array can send Flag information back to the Flag Registers. Flag information can be returned without having been solicited by other commands. Thus, the user array can indicate that an internal user array action is complete and that it is time to start an external action, such as starting a DMA sequence to store a result. The user array can also request an interrupt by setting FR31. An interrupt request from the user array is processed the same as if the interrupt came from any other source (data error, ComList command, Illegal instruction, etc.).

DMA activity can also interact with the user array. The DMA Flag Set command can be followed with U_Data commands. With multiple ways to control the Flag Registers and given that all commands can test the Flag Registers, coordinated interaction is easily done between all three elements of MAP: user array, DMA and other ComList processing.

Fetch Configuration Data Command requests that the DMA move an FPGA configuration block of data between common memory and the MAP. The Fetch Configuration Data Command must be the last command in a ComList.

Valid data for a Fetch Configuration Data Command is as follows:

| | |
|---|---|
| size | 00, One word command |
| code | 1001, DMA Configuration Data Command Code |
| a, b | unused |
| c | 0, clear Flag when data movement complete |
| | 1, set Flag when data movement complete |
| d, e, f | unused |
| aa | Common Memory address DR |
| bb | Movement complete FR |
| cc | User FPGA to configure (0, 1, 2, or 3) |
| dd | Data length DR (number of operands to be moved) |
| ee, ff, gg, hh | unused |

After the command issues, the command processor and the DMA will go into a special non-interruptible mode until the FPGA is configured. During configuration normal ComList commands will not be fetched or executed from the ComList area of common memory. After the data is loaded, the user FPGAs are checked for proper configuration. When the FPGA has been properly configured, a status indication and interrupt will be returned to the processor indicating that the MAP is returning to normal operation.

Direct Commands are sent directly to a MAP from an instruction processor or another MAP, therefore they are not included in a ComList. These commands give a real-time and direct control to meet operating system needs, and driver requirements. Direct commands have no parameters.

Direct commands of the preferred embodiment of the present invention are as follows:

| Command | Function |
|---|---|
| Initialize | Master Clear. |
| Load Fixed Configuration | Configure the fixed portion of MAP logic from local MAP ROM. |
| Load Parameter Set | Get control parameters from Status and Control Area. |
| Stop | Finish any current instructions and halt. Save status in Status and Control Area. |
| Fetch0 | Fetch ComList0 from common memory and begin execution. |
| Fetch1 | Fetch ComList1 from common memory and begin execution. |
| Continue | Fetch the next ComList entry and start execution. |
| Continue From Saved | Load state data from saved area in on-board memory and continue. |

With the exception of the Initialize, Stop, Fetch0 and Fetch1 commands, which can be given at any time, the other direct commands are valid only if the MAP is stopped. An Initialize command must be done after system power-up and before anything else is done with/to a MAP.

Stopping/halting MAP execution can result from several sources. In all cases this requires setting or attempting to set FR31. When there is an attempt to set FR31 either directly, as with the ComList DMA Flag Set command, or indirectly, as with the direct Stop command, or as a result of some internal error, execution of the MAP is halted.

Upon any halt or exception, with Stop enabled, the following occurs:

1) MAP control logic comes to the most graceful halt it can, waiting for execution logic to go quiet.
2) Control state is saved in on-board memory addresses 0–31. This state includes everything needed to continue execution, for example from a TLB/Page Table miss. This area in on-board memory is reserved for this use.
3) Status is stored into the MAP's status and control area in its Base page.
4) The MAP's TLB registers are stored into the TLB area of its Base page.
5) If the stop did not come from a direct command, and if interrupts are enabled, an interrupt is sent.
6) The MAP unit halts.

If Stop is not enabled, the sequence above is executed except that in the last step the command that caused the error is abandoned and execution continues.

To continue execution after execution halts:

1) Make any necessary changes to the MAP's parameters in the status and control area, including the TLB entries.
2) Determine if processing is to continue from the interrupted command, the next command or from another command sequence.
3) If continuing execution of the instruction that caused the halt, reload parameters (Load Parameter Set) and then Continue from Saved.
4) If the Halt was not caused by an error or TLB miss (so that no instruction is partially executed) and the status and control parameters do not require changing or updating, then the direct command Continue can be sent to the MAP.
5) If a new sequence is to be started (for example, a new user or the current user with different commands), make sure the proper command sequence is stored in ComList starting at ComList zero, issue Direct commands to load parameters and Start execution.

Execution of the direct commands Start, Continue, or Continue From Saved clears FR31 but does not clear the status register. Software must do that, if needed or wanted, before parameters are reloaded (step above).

When MAP execution is halted, status is stored in the MAP's status and control area. Status consists of several registers as listed below. The 8-byte Index column shows the address offset from the start of a MAP's status and control area as an 8-byte word index.

| 8-Byte Index | Field | Bit Position | Function |
|---|---|---|---|
| 0 | Stopped | 00 | 1 if MAP is stopped |
| | Cause Bits | 1–8 | |
| | Missed Page | 1 | Requested page not present |
| | ComList | 2 | Executed Halt command |
| | Illegal | 3 | Illegal instruction in ComList |
| | U_Logic Interrupt | 4 | U_Logic interrupt (set FR31) |
| | ComList Interrupt | 5 | ComList command (set FR31) |
| | DMA Data | 6 | DMA Data error (affected by Stop on Corr_Err) |
| | U_Data | 7 | U_Logic determined data error |
| | Other Data | 8 | Other MAP data error |
| | ComList Pointer | 32–41 | Next ComList command |
| 2 | Miss Address | 00–49 | Virtual address that caused page miss |
| 4 | Data Address | 00–51 | Common Memory address of DMA data error |
| | Syndrome | 52–63 | Syndrome of data error |
| 5 | Data | 00–63 | Data word in error |

Positions not shown in the table are stored as 0 bits. Bit3/Illegal is also set, and execution halted, if the last command in the ComList page is executed and is not a taken branch.

Several control parameters are stored in a MAP's status and control area. Bits not shown in the following table must be zero.

| 8-Byte Index | Field | Bit Position | Function |
|---|---|---|---|
| 8 | Bit Parameters | 00–07 | Cell text |
| | Disable interrupts | 0 | 0-Interrupts enabled<br>1-Interrupts disabled |
| | Contu on Error | 1 | 0-Stop execution on error<br>1-Continue command execution on error |
| | Stop on Corr-err | 2 | 0-Continue execution if corrected error<br>1-Halt execution if corrected error |
| | Maintenance 1 | 6 | |
| | Maintenance 2 | 7 | |
| | Interrupt ID | 32–41 | ID number of processor to interrupt |
| 10 | Page Table Base | 00–39 | Physical address of Page Table |

Contu on Error should normally be used only in a diagnostic or maintenance mode. The expected defaults for Bit Parameters 0, 1, and 2 are the zero-values. The Interrupt ID parameter need not be valid if interrupts are disabled. Page Table Base must be valid and point to an end-of-table entry.

It will be apparent to those skilled in the art that various modifications and variations can be made in the interface for integrating reconfigurable processors without departing from the spirit or scope of the invention. Thus, it is intended that the present invention covers the modifications and variations of this invention provided that they come within the scope of any claims and their equivalents.

What is claimed is:

1. A method for processing command processor commands compiled from a user application, said method comprising the steps of:
   storing command lists into an area of common memory;
   receiving a fetch command sent by the user application;
   fetching a command list from the common memory;
   loading the command list into a command list memory within an interface;
   processing of the command list;
   interacting with user logic to exchange data and control signals;
   determining if a second command list is ready for processing; and
   wherein if the second command list is ready for processing, processing the second command list in the same method as the command list, and wherein otherwise await a second fetch command.

2. The method of claim 1, wherein the loading of the command list further comprises receiving a fetch done signal when the entire command list has been loaded.

3. The method of claim 1, wherein the processing of the command list further comprises the step of determining if the command list length exceeds a length limit,
   wherein if the command list length exceeds the length limit, an interrupt is generated and processing of the command list is halted.

4. The method of claim 1 further comprising the step of halting execution.

5. The method of claim 4, wherein the halting execution further comprises the steps of:
   terminating the execution of control logic;
   saving control state data in dedicated memory;
   saving status and control data;
   saving translation look-aside data;
   if halt request was not received via a direct command, and if interrupts are enabled, sending an interrupt; and
   halting further execution.

6. The method of claim 4 further comprising the step of continuing execution.

7. The method of claim 6 wherein continuing execution further comprises the steps of:
   determining reason for halting execution; and
   restarting execution.

8. The method of claim 7, wherein if processing is to be continued from a partially processed instruction, the step of restarting execution further comprises the steps of:
   making necessary changes to parameters in the status and control data, and translation look-aside data;
   reloading control state data in dedicated memory;
   reloading status and control data;
   reloading translation look-aside data;
   issuing a continue from saved command; and
   processing instructions.

9. The method of claim 7, wherein if processing is to be continued from a fully processed instruction, the step of restarting execution further comprises the steps of:
   reloading control state data in dedicated memory;
   reloading status and control data;
   reloading translation look-aside data;
   issuing a continue command; and
   processing instructions.

10. The method of claim 7, wherein if a new sequence is to be started, the step of restarting execution further comprises the steps of:
    loading a command list;
    issuing a direct command to start execution; and
    processing the command list.

* * * * *